United States Patent
Jaradi et al.

(10) Patent No.: US 10,040,421 B2
(45) Date of Patent: Aug. 7, 2018

(54) LOAD-LIMITING RETRACTOR

(71) Applicant: Ford Global Technologies, LLC, Dearborn, MI (US)

(72) Inventors: Dean M. Jaradi, Macomb, MI (US); Saeed David Barbat, Novi, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 237 days.

(21) Appl. No.: 15/164,981

(22) Filed: May 26, 2016

(65) Prior Publication Data

US 2017/0341625 A1   Nov. 30, 2017

(51) Int. Cl.
  *B60R 22/46*  (2006.01)
  *B60R 22/38*  (2006.01)
  *B60R 22/34*  (2006.01)

(52) U.S. Cl.
  CPC ...... *B60R 22/4676* (2013.01); *B60R 22/3413* (2013.01); *B60R 22/38* (2013.01)

(58) Field of Classification Search
  CPC .. B60R 22/4676; B60R 22/3413; B60R 22/38
  See application file for complete search history.

(56) References Cited

U.S. PATENT DOCUMENTS

| | | | |
|---|---|---|---|
| 3,790,099 A * | 2/1974 | Beller | B60R 22/34 242/107.4 |
| 5,967,441 A * | 10/1999 | Kohlndorfer et al. | B60R 22/34 242/379.1 |
| 6,206,315 B1 | 3/2001 | Wier | |
| 6,568,621 B2 | 5/2003 | Hiramatsu et al. | |
| 9,283,928 B2 | 3/2016 | Lee et al. | |
| 2011/0000996 A1 | 1/2011 | Wigstrom et al. | |
| 2013/0214081 A1 * | 2/2013 | Uchibori | B60R 22/36 242/384.1 |

FOREIGN PATENT DOCUMENTS

| | | |
|---|---|---|
| DE | 102008041510 A1 | 3/2010 |
| JP | 4890487 B2 | 12/2011 |
| JP | 5048374 B2 | 7/2012 |

OTHER PUBLICATIONS

JP 5048374 B2 ip.com English Machine Translation, published Oct. 2012, filed Mar. 2007 (Year: 2012).*

* cited by examiner

*Primary Examiner* — Karen Beck
(74) *Attorney, Agent, or Firm* — Frank A. MacKenzie; Bejin Bieneman PLC (57) ABSTRACT

A retractor includes a spool, a torsion bar and a torsion tube rotationally fixed to the spool, and a locking member aligned with the torsion bar. The torsion bar and the torsion tube extend coaxially from the spool to respective first ends, and the torsion bar has a key. The locking member is movable from an unlocked position rotationally disengaged with the torsion bar to a locked position wherein the key rotationally fixes the locking member to the first end of the torsion bar. When the locking member is in the unlocked position, the torsion bar may be plastically deformed to limit the load applied by webbing against an occupant. If sufficient force is applied to the webbing, the locking member moves to the locked position in which both torsion bar and the torsion tube are locked together and, in tandem, limit the load applied by the webbing.

18 Claims, 7 Drawing Sheets

LOAD-LIMITING RETRACTOR

BACKGROUND

A seat belt in a vehicle may be equipped with "load limiting" features. During a collision, a retractor of the seat belt may lock webbing of the seat belt from further extension from the retractor, but load-limiting features permit some additional limited extension of the webbing when the force exerted on the webbing exceeds a load-limiting threshold. This additional extension of the webbing from the retractor limits the load applied by the webbing to the chest of an occupant to reduce the chest deflection.

Load limiting may be achieved through use of a torsion bar. One end of the torsion bar may be connected to a spool around which the webbing is wound in the retractor. In the event of a collision, the other end of the torsion bar may be fixed. As an occupant exerts a force tending to extract the webbing from the retractor, the spool applies a twisting force to the torsion bar. The torsion bar yields, that is, deforms, at a known threshold force. The force imparted to an occupant through the seat belt is thus limited by the threshold force of the torsion bar.

DETAILED DESCRIPTION

Figure 4A:
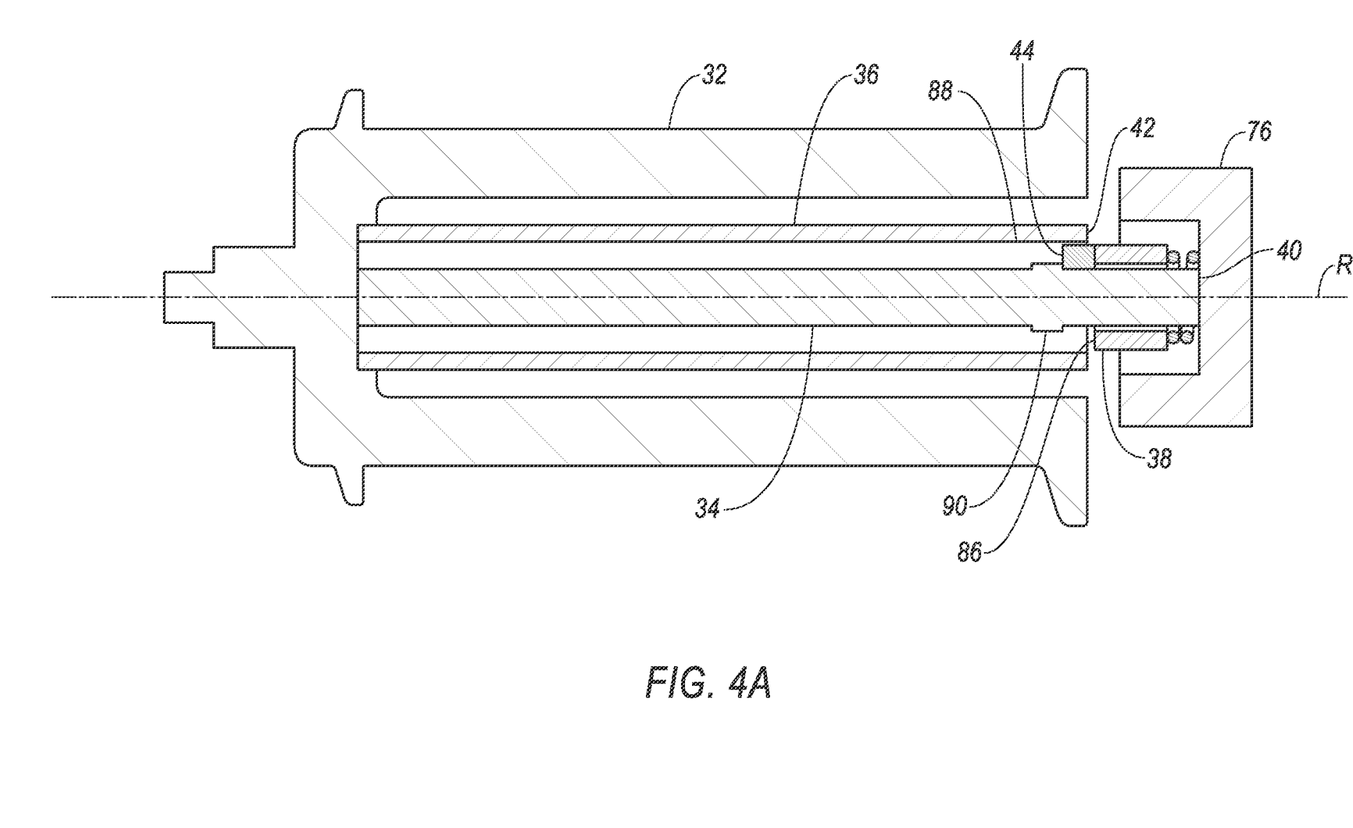
FIG. 4A is a cross-sectional view of a spool, torsion bar, torsion tube, ratchet, and locking member of the retractor when the retractor is in a lower load-limiting phase.
Figure 4B:
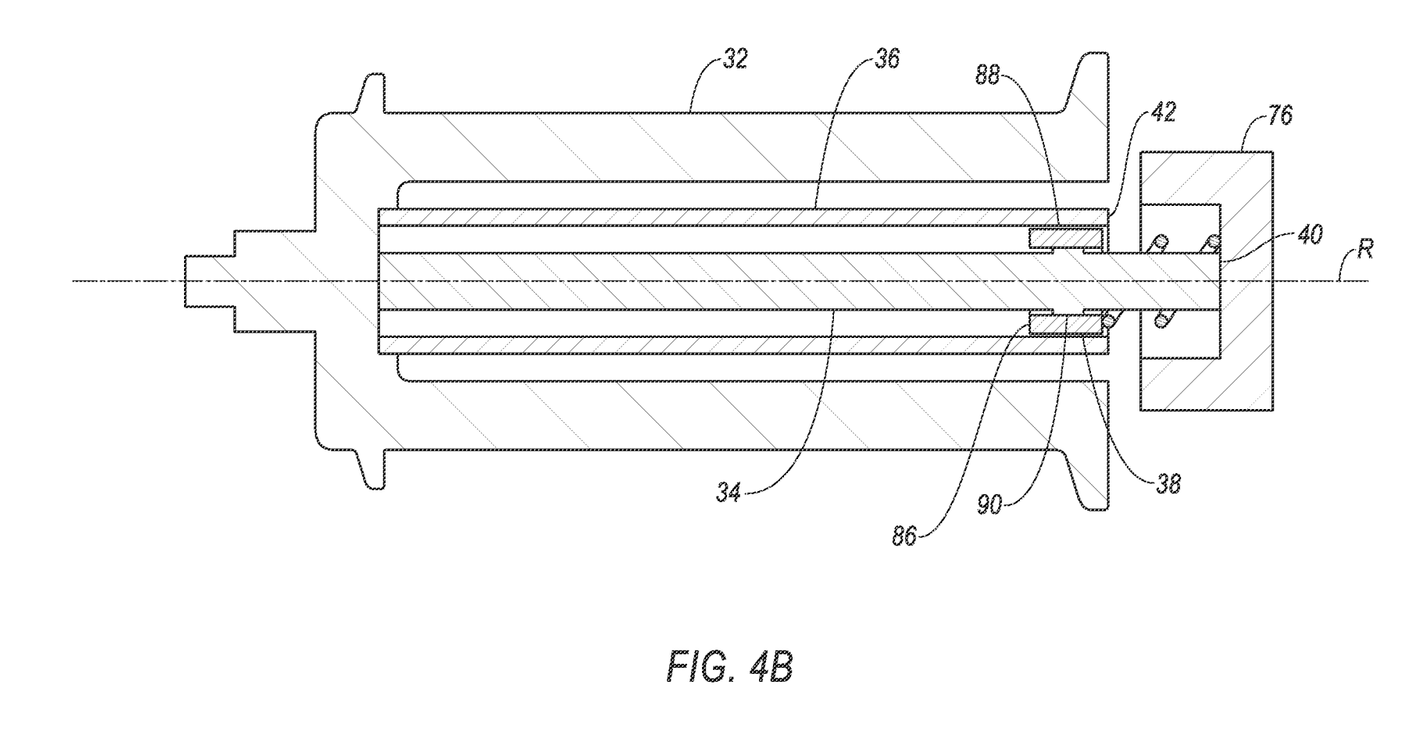
FIG. 4B is a cross-sectional view of the spool, torsion bar, torsion tube, ratchet, and locking member when the retractor is in a higher load-limiting phase.

With reference to the Figures, wherein like numerals indicate like parts throughout the several views, a retractor 30 of a restraint system 52 includes a spool 32, a torsion bar 34 and a torsion tube 36 rotationally fixed to the spool 32, and a locking member 38 aligned with the torsion bar 34. The torsion bar 34 and the torsion tube 36 extend coaxially from the spool 32 to respective first ends 40, 42, and the torsion bar 34 has a key 44. The locking member 38 is movable from an unlocked position, as shown in FIG. 4A, rotationally disengaged with the torsion bar 34 to a locked position, as shown in FIG. 4B, wherein the key 44 rotationally fixes the locking member 38 to the first end 40 of the torsion bar 34.

When the retractor 30 is in a locked position, as set forth further below, the retractor 30 has a lower load-limiting phase in which the torsion bar 34 deforms relative to the spool 32 and the torsion tube 36, and a higher load-limiting phase in which both the torsion bar 34 and the torsion tube 36 deform relative to the spool 32. The difference in the progressive load limiting between the two phases accommodates occupants 50 of different sizes. A relatively small occupant 50, such as a female in the 5th percentile for size or a 6-year-old child, may exert a relatively low force on the retractor 30 (through webbing 54 as discussed below) sufficient to initiate the lower load-limiting phase and insufficient to initiate the higher load-limiting phase. In contrast, a relatively large occupant 50, such as a male in the 50th or 95th percentile for size, may exert sufficient force on the webbing 54 for the retractor 30 to enter the higher load-limiting phase. The additional extension of the webbing 54 from the retractor 30 during the lower load-limiting phase and the high load-limiting phase limits the load applied by the webbing 54 to the chest of an occupant to reduce the chest deflection.

Figure 1:
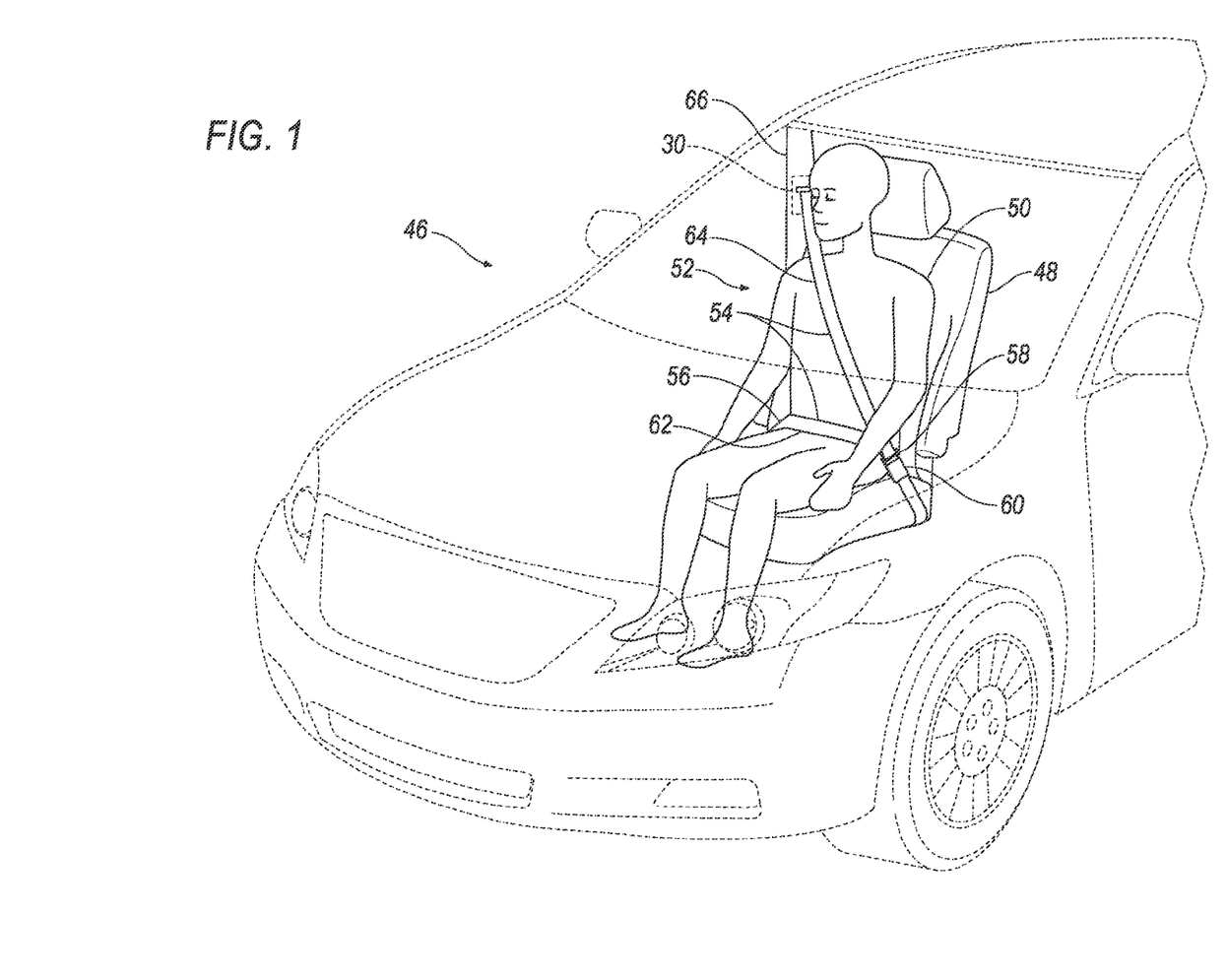
FIG. 1 is a perspective view of a vehicle including a restraint system.

As shown in FIG. 1, a vehicle 46 includes a seat 48 that may support an occupant 50. The seat 48 may be a front seat or a rear seat, and may be in any cross-vehicle position. The seat 48 shown in FIG. 1 is a bucket seat, but alternatively the seat 48 may be a bench seat or another type of seat.

The restraint system 52 may include the retractor 30, the webbing 54 retractably payable from the retractor 30, a lap belt mounting 56 coupled to the webbing 54, and a clip 58. The clip 58 may be adjustable along the webbing 54 and may selectively engage a buckle 60 fixed relative to the seat 48. The restraint system 52, when fastened, retains the occupant 50 on the seat 48, for example, during sudden decelerations of the vehicle 46.

The lap belt mounting 56 attaches one end of the webbing 54 to the seat 48. The other end of the webbing 54 feeds into the retractor 30. The clip 58 slides freely along the webbing 54 and, when engaged with the buckle 60, divides the webbing 54 into a lap band 62 and a shoulder band 64.

The restraint system 52 of FIG. 1 is a three-point harness, meaning that the webbing 54 is attached at three points around the occupant 50 when fastened: the lap-belt mounting, the retractor 30, and the buckle 60. The restraint system 52 may, alternatively, include another arrangement of attachment points.

The retractor 30 may be attached to a body (not numbered) of the vehicle 46, e.g., to a B pillar 66 in the instance the seat 48 is a front seat, to a C pillar (not numbered) when the seat 48 is a rear seat, etc. The retractor 30 may alternatively be mounted to the seat 48.

Figure 2:
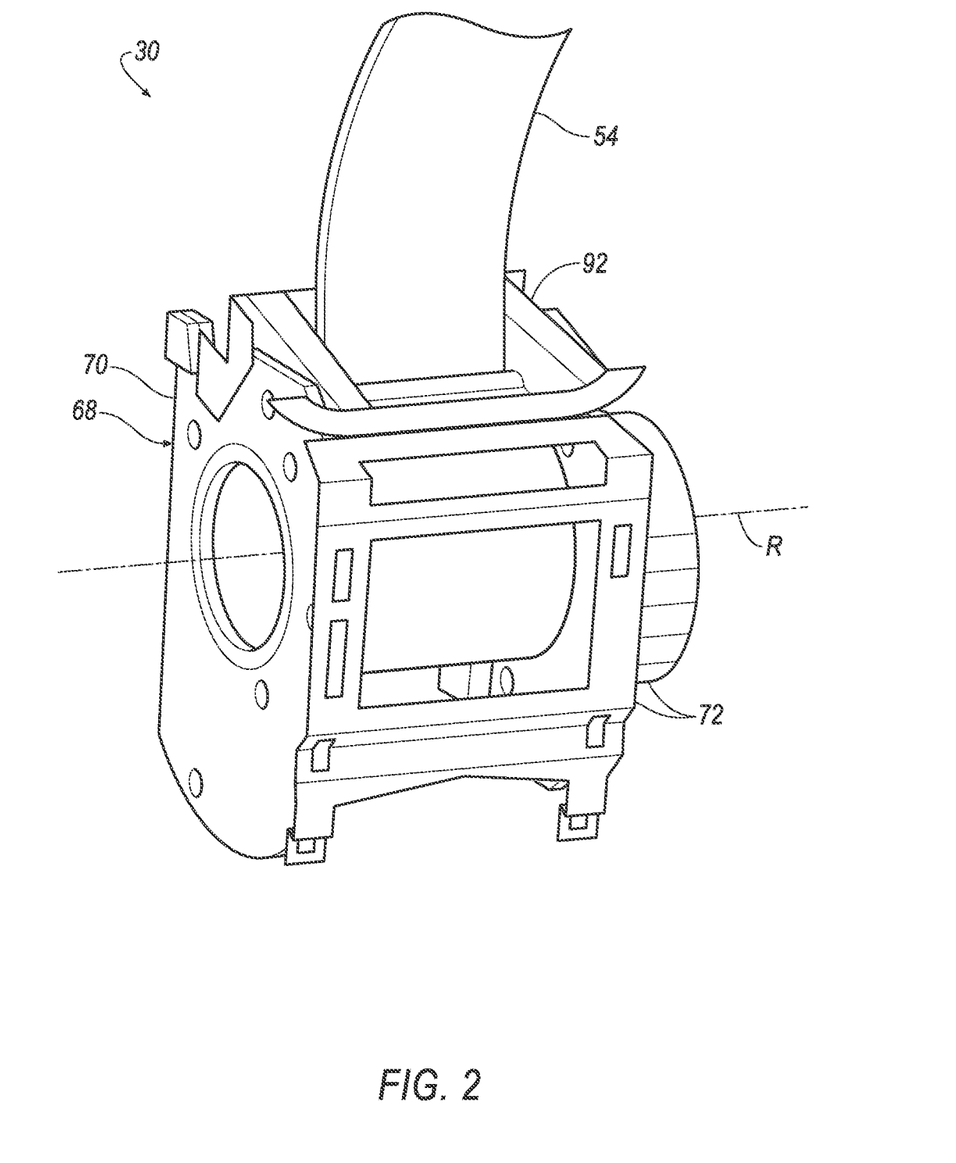
FIG. 2 is a perspective view of a portion of the restraint system.

As shown in FIG. 2, the retractor 30 may include a housing 68. The housing 68 may include a housing body 70, housing covers 72 attached to the housing body 70, and a webbing guide 92 attached to the housing body. The housing 68 may be formed of metal or plastic. The housing 68 may be mounted to a body (not numbered) of the vehicle 46, e.g., to the B pillar 66 in the instance the seat 48 is a front seat, to a C pillar (not numbered) when the seat 48 is a rear seat, or may be mounted to the seat 48.

Figure 3:
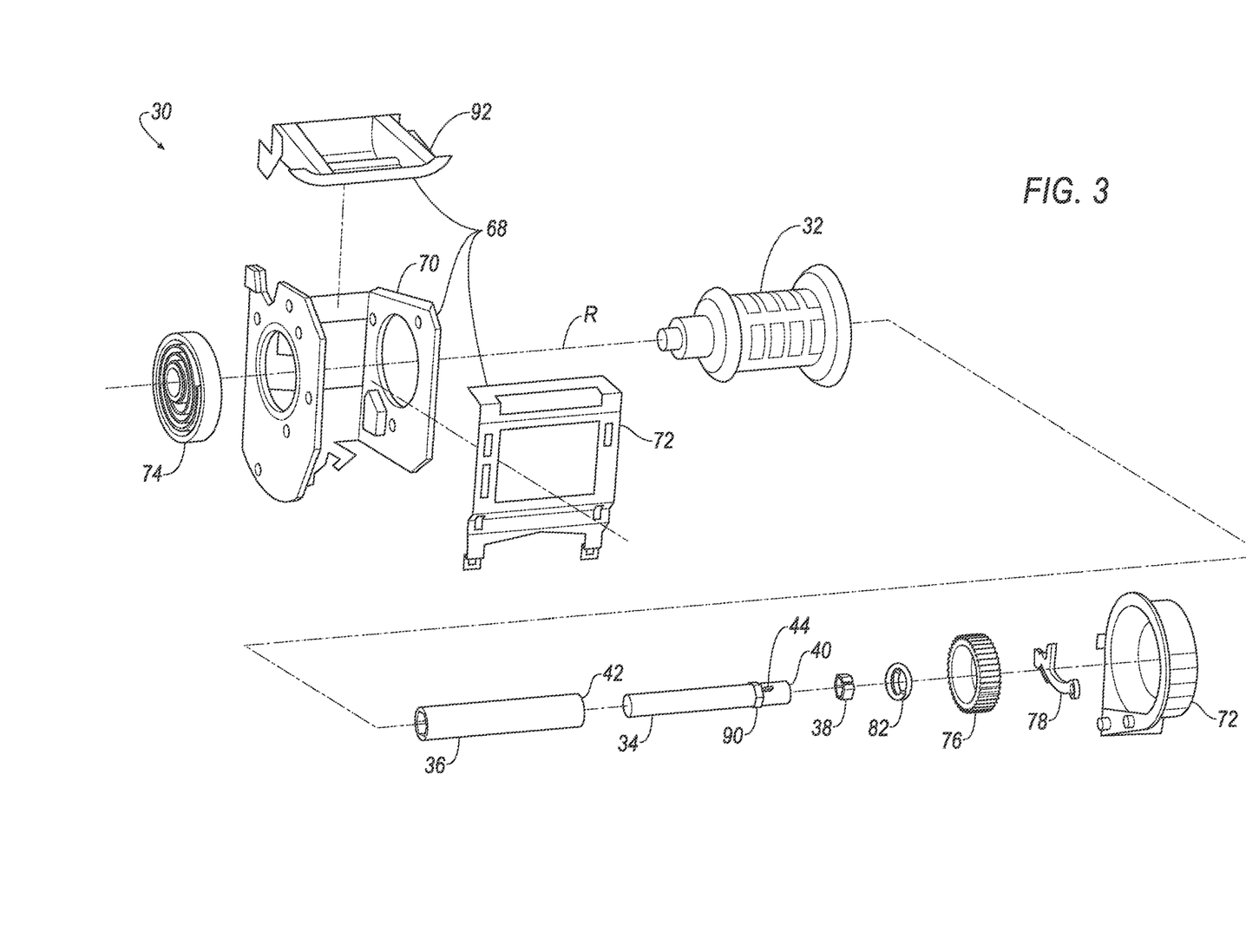
FIG. 3 is an exploded view of a retractor in the restraint system.

With reference to FIG. 3, the spool 32 is rotatably coupled to the housing 68. The spool 32 may freely rotate relative to the housing 68, and may be fixed to the housing 68 in all other degrees of freedom. The spool 32 may be cylindrical in shape. The spool 32 may define a rotation axis R about which the spool 32 rotates. The spool 32 may be adapted to receive the webbing 54, for example, by including a webbing attachment slot (not numbered) and permitting the webbing 54 to wind around the spool 32.

As shown in FIG. 2, the webbing 54 may be attached to the spool 32. Specifically, one end of the webbing 54 may be attached to the lap belt mounting 56, and another end of the webbing 54 may be attached to the spool 32, with the webbing 54 wound around the spool 32 beginning at that end. The webbing 54 may be formed of a fabric in the shape of a strap.

As shown in FIG. 3, a spool spring 74 may be coupled to the spool 32 and the housing 68. The spool spring 74 may be loaded in tension or compression when the webbing 54 is fully retracted, and the spool spring 74 may be further loaded in either tension or compression when the webbing 54 is extended from the spool 32. Thus, the spool spring 74 may exert a force tending to retract the webbing 54. The spool spring 74 may be a spiral torsion spring or any other suitable type of spring.

As shown in FIGS. 3-4B, the torsion bar 34 is rotationally fixed to the spool 32, i.e., an end of the torsion bar 34 is fixed to the spool 32 and not rotatable relative to the spool 32. The torsion bar 34 extends axially from the spool 32 to the first end 40. The torsion bar 34 may extend axially from the spool 32 within the spool 32.

The retractor 30 may be moved between an unlocked position and the locked position. In the unlocked position, the spool 32 freely rotates within the housing 68 to allow the webbing 54 to be extended from and retracted into the retractor 30. In the unlocked position, the torsion bar 34 and the torsion tube 36 rotate with the spool 32. In the locked position, the first end 40 of the spool 32 may be rotationally locked relative to the housing 68, which prevents extension of the webbing 54 from the retractor 30 to limit forward movement of the occupant 50. When the retractor 30 is in the locked position, the locking member 38 may be in the unlocked position for operation in the lower load-limiting phase, as shown in FIG. 4A, or in the locked position for operation in the higher load limiting phase, as shown in FIG. 4B.

The retractor 30 may include a locking device (not numbered) for locking the spool 32 relative to the housing 68. For example, the first end 40 of the spool 32 may be attached to a ratchet 76 and a pawl 78. The torsion bar 34 may be designed to rotationally yield, that is, plastically deform, as the torsion bar 34 is rotated by the spool 32 but fixed by the ratchet 76. In particular, the torsion bar 34 may be formed of suitable shape, dimension, and material to yield when subjected to a threshold rotational force. For example, if the ratchet 76 is locked but the webbing 54 exerts a rotational force on the spool 32, the torsion bar 34 may prevent the spool 32 from rotating unless the force exceeds a threshold, in which case the rotational yielding may permit the spool 32 to rotate. Thus, the load held by the webbing 54 may be limited. The torsion bar 34 may progressively increase the load by the webbing 54; i.e., the force to rotationally yield the torsion bar 34 may increase as the torsion bar 34 is rotated such that the load by the webbing 54 is progressively increased as the torsion bar 34 further twists.

Figure 5:
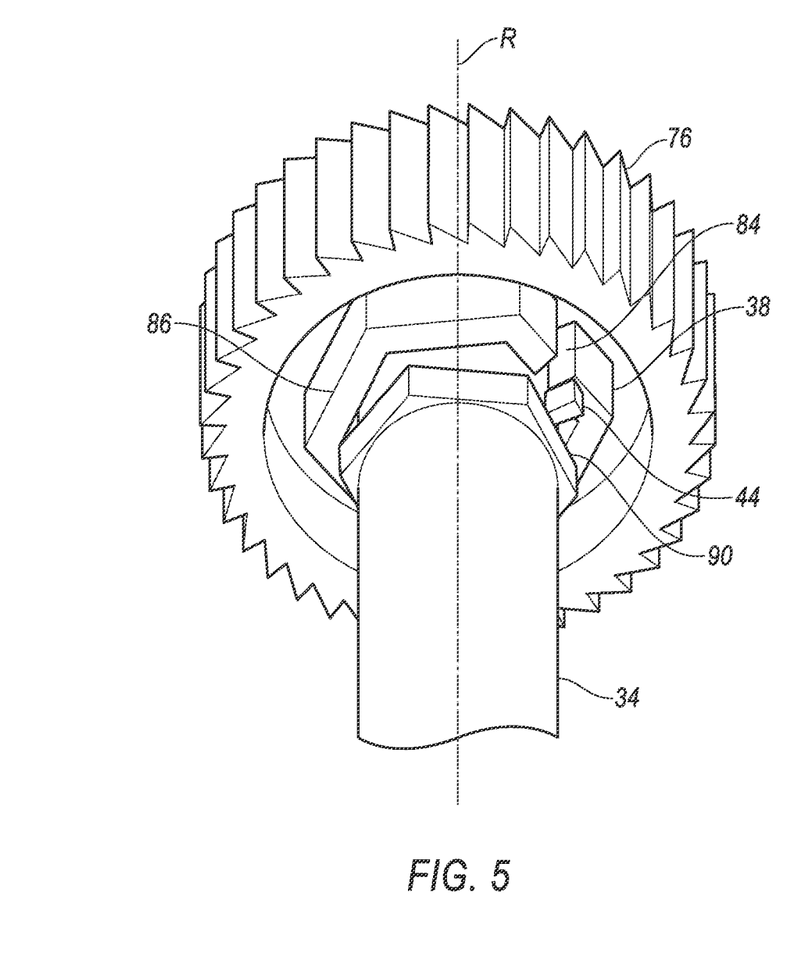
FIG. 5 is a perspective view of the ratchet, the locking member, and an end of the torsion bar of the retractor.

As shown in FIGS. 3-5, the ratchet 76 is attached to the first end 40 of the torsion bar 34. The ratchet 76 includes a plurality of teeth, which are aligned circumferentially around and extend radially from the ratchet 76. Each tooth includes a first side and a second side, wherein the first side has a shallower angle relative to a circumference of the ratchet 76 than the second side. When the ratchet 76 rotates relative to the pawl 78 such that the first sides of the teeth are presented to the pawl 78, the pawl 78 slides over the teeth, and when the ratchet 76 rotates relative to the pawl 78 such that the second sides of the teeth are presented to the pawl 78, the pawl 78 catches on the second side and prevents rotation of the ratchet 76.

As shown in FIG. 3, the pawl 78 is hingedly coupled to the housing 68. The pawl 78 is movable between an unlocked position spaced from the ratchet 76 and a locked position engaging the ratchet 76. The pawl 78 has a hinged end and a free end. In the unlocked position, the free end is spaced from the ratchet 76. In the locked position, the free end is touching the ratchet 76.

The retractor 30 may include an activation sensor (not shown) that senses sudden deceleration of the vehicle 46 and triggers activation of the locking device, e.g., the ratchet 76 and pawl 78, to engage the first end 40 of the torsion bar 34. The activation sensor may be in communication with the pawl 78, either directly or indirectly through a controller (not shown). The activation sensor may be located in the retractor 30 or elsewhere in the vehicle 46. In the retractor 30, the activation sensor may be, for example a weighted pendulum, a centrifugal clutch, or any other suitable type. In the vehicle 46 outside the retractor 30, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

As shown in FIGS. 4A and 5-8, the torsion bar 34 has the key 44. The key 44 may be a protrusion that extends radially from the torsion bar 34 and prevents, for example, the locking member 38 from sliding axially along the torsion bar 34. The key 44 may be formed of the same material as the torsion bar 34 and form a single piece with the torsion bar 34, or the key 44 may be fastened or attached to the torsion bar 34 and made of any suitable material.

As shown in FIGS. 3-4B, the torsion tube 36 is rotationally fixed to the spool 32, i.e., an end of the torsion tube 36 is fixed to the spool 32 and not rotatable relative to the spool 32. The torsion tube 36 extends coaxially with the torsion bar 34 from the spool 32 to the first end 42. The torsion tube 36 may extend axially from the spool 32 within the spool 32. The first end 42 may be unconstrained when the locking member 38 is in the unlocked position and rotationally fixed when the locking member 38 is in the locked position. The torsion tube 36 may be designed to rotationally yield, that is, plastically deform, as the torsion tube 36 is rotated by the spool 32 but fixed by the ratchet 76. In particular, the torsion tube 36 may be formed of suitable shape, dimension, and material to yield when subjected to a threshold rotational force. For example, if the locking member 38 is in the locked position but the webbing 54 exerts a rotational force on the spool 32, the torsion tube 36 may prevent the spool 32 from rotating unless the force exceeds a threshold, in which case the rotational yielding may permit the spool 32 to rotate. Thus, the load held by the webbing 54 may be limited. The torsion tube 36 may progressively increase the load by the webbing 54; i.e., the force to rotationally yield the torsion tube 36 may increase as the torsion tube 36 is rotated such that the load by the webbing 54 is progressively increased as the torsion tube 36 further twists.

Figure 6:
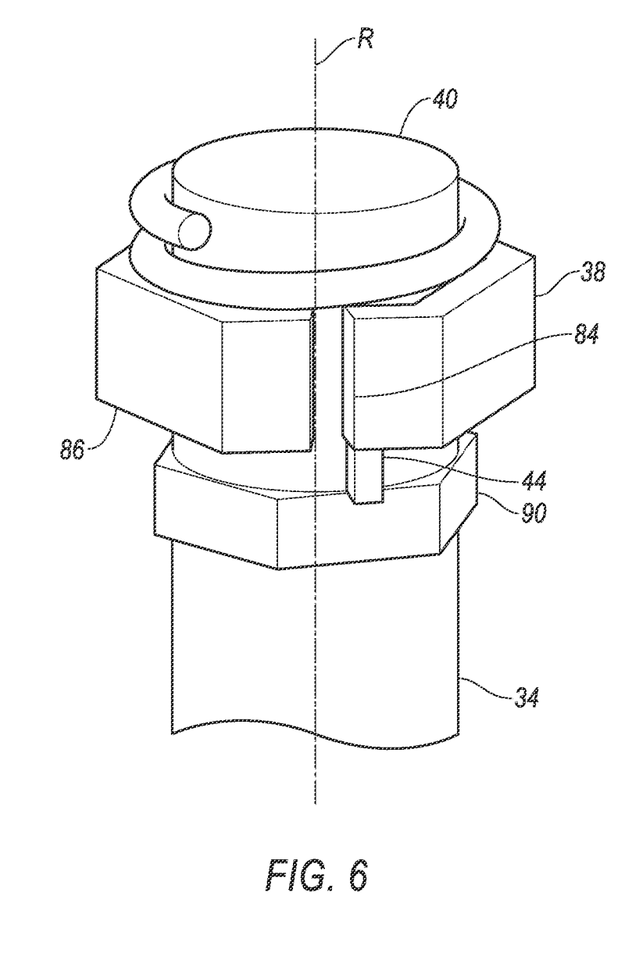
FIG. 6 is a perspective view of a spring, the locking member, and the end of the torsion bar of the retractor.
Figure 7:
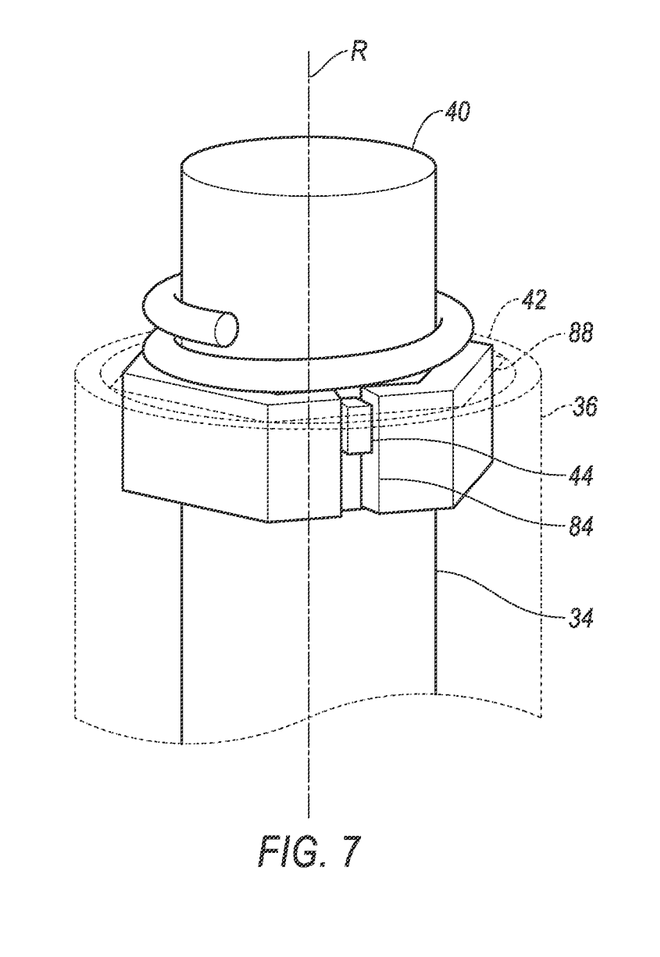
FIG. 7 is a perspective view of the spring, the locking member, the end of the torsion bar, and a torsion tube of the retractor.

As shown in FIGS. 3 and 6-7, a spring 82 is disposed between the ratchet 76 and the locking member 38. The spring 82 may be attached to the ratchet 76. When the locking member 38 is in the unlocked position, the spring 82 may be in compression and exerting a force against the locking member 38.

Figure 8:
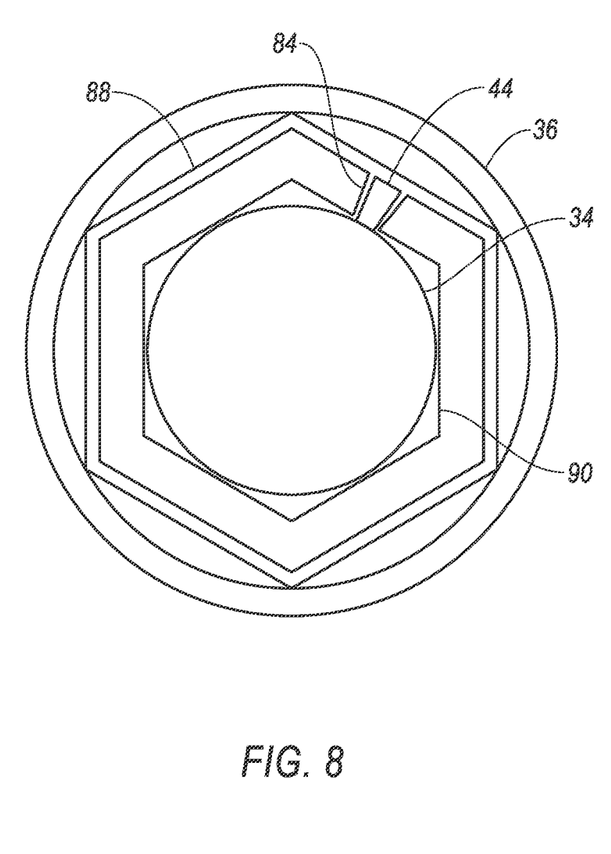
FIG. 8 is a side view of the torsion bar, the locking member, and the torsion tube of the retractor.

The locking member 38 is aligned with the torsion bar 34 and movable from the unlocked position rotationally disengaged with the torsion bar 34, as shown in FIGS. 4A and 5-6, to a locked position wherein the key 44 rotationally fixes the locking member 38 to the first end 40 of the torsion bar 34, as shown in FIGS. 4B and 7-8. The locking member 38 may be a nut 38 including a slot 84. The nut 38 may have a surface 86 having a coating that has a low coefficient of friction relative to other surfaces of the nut 38.

The nut 38 may have an exterior shape, and the exterior shape of the nut 38 may be polygonal. Specifically, the exterior shape of the nut 38 may be hexagonal, that is, have six sides of identical length.

As shown in FIGS. 7-8, the torsion tube 36 may include a recess 88 disposed at the first end 42. The recess 88 may be defined to receive the exterior shape of the nut 38. In other words, a cross section of the recess 88 may have the same shape and be larger than a cross section of the exterior shape of the nut 38. Thus, when the exterior shape of the nut 38 is aligned with the shape of the recess 88, the nut 38 is able to enter the recess 88, but when the exterior shape of the nut 38 is not aligned with the shape of the recess 88, the torsion tube 36 prevents the nut 38 from entering the recess 88.

The nut 38 also has an interior shape, and the interior shape of the nut 38 may be polygonal. Specifically, the interior shape of the nut 38 may be hexagonal, that is, have six sides of identical length.

As shown in FIGS. 5-6, the torsion bar 34 may include a circumferential protrusion 90. The circumferential protrusion 90 may be defined to receive the interior shape of the nut 38. In other words, a cross section of the circumferential protrusion 90 may have the same shape and be smaller than a cross section of the interior shape of the nut 38. Thus, when the interior shape of the nut 38 is aligned with the shape of the circumferential protrusion 90, the nut 38 is able to slide over the circumferential protrusion 90, but when the interior shape of the nut 38 is not aligned with the shape of the circumferential protrusion 90, the circumferential protrusion 90 prevents the nut 38 from sliding over the circumferential protrusion 90.

As shown in FIGS. 4A and 5-6, when the locking member 38 is in the unlocked position, the key 44 pushes against the locking member 38. Specifically, the key 44 pushes against the surface 86 of the nut 38 when the locking member 38 is in the unlocked position. The spring 82 is in compression when the locking member 38 is in the unlocked position. Furthermore, when the locking member 38 is a nut 38 in the unlocked position, the recess 88 may not have received the nut 38 and the nut 38 may be spaced from the circumferential protrusion 90.

As shown in FIGS. 4B and 7-8, when the locking member 38 is in the locked position, the locking member 38 rotationally fixes the first end 40 of the torsion bar 34, and the locking member 38 may also fix the first end 42 of the torsion tube 36. When the locking member 38 is a nut 38 in the locked position, the slot 84 engages the key 44; that is, the key 44 is disposed in the slot 84, and sides of the slot 84 prevent the key 44 from rotating relative to the slot 84. Furthermore, the recess 88 may receive the nut 38 and the nut 38 may extend around the circumferential protrusion 90.

In the event of a sudden impact, the activation sensor may trigger the locking device, e.g., engage the pawl 78 with the ratchet 76. The pawl 78 may move from the unlocked position to the locked position, engaging the ratchet 76. At the same time, the inertia of the occupant 50 pushes the occupant 50 against the webbing 54. The tensile force in the webbing 54 tends to pull the webbing 54 from the spool 32. The ratchet 76, connected to the spool 32 through the torsion bar 34, may prevent rotation of the spool 32 until the tensile force in the webbing 54 exceeds the threshold force to cause the torsion bar 34 to deform. As the torsion bar 34 deforms, the key 44 may rotate relative to the locking member 38. The key 44 may begin at an initial position near the slot 84 and rotate away from the slot 84. The key 44 may slide against the surface 86 of the locking member 38 that has a low coefficient of friction relative to the other surfaces of the locking member 38. As the torsion bar 34 deforms, the key 44 may rotate almost a full revolution until they key 44 aligns with the slot 84 of the locking member 38. The spring 82 may push the locking member 38 from the unlocked position to the locked position. The key 44 may engage the slot 84 and prevent the locking member 38 from rotating relative to the first end 40 of the torsion bar 34. In the example where the locking member 38 is the nut 38, the exterior shape of the nut 38 may engage the recess 88 of the torsion tube 36 and the interior shape may engage the circumferential protrusion 90 of the torsion bar 34. The first end 42 of the torsion tube 36 may now be fixed relative to the ratchet 76. The ratchet 76 now prevents rotation of the spool 32 until the tensile force in the webbing 54 exceeds the combined threshold forces to cause both the torsion bar 34 and the torsion tube 36 to deform. Thus, the load limiting of the retractor 30 has the lower load-limiting phase in which only the torsion bar 34 deforms and the higher load-limiting phase in which the torsion bar 34 and the torsion tube 36 deform together.

As set forth above, the torsion bar 34 progressively increases the load by the webbing 54 as the torsion bar 34 is increasingly twisted in the lower load-limiting phase. Thus, the resistance to the extension of the webbing 54 from the retractor 30 increases as more webbing is pulled from the retractor 30 in the lower load-limiting phase. If sufficient force is applied to the webbing 54 to rotate the torsion bar 34 sufficiently to engage the key 44 in the slot 84 to activate the higher load-limiting phase, the torsion bar 34 and the torsion tube 36 in tandem progressively increase resistance to the extension of the webbing 54 from the retractor 30 as more webbing 54 is pulled from the retractor 30 in the higher load-limiting phase. The additional extension of the webbing 54 from the retractor 30 during the lower load-limiting phase and the high load-limiting phase limits the load applied by the webbing 54 to the chest of an occupant to reduce the chest deflection.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A retractor comprising:
    a spool;
    a torsion bar and a torsion tube rotationally fixed to the spool and extending coaxially from the spool to respective first ends, the torsion bar having a key; and
    a nut aligned with the torsion bar, including a slot, and movable from an unlocked position rotationally disengaged with the torsion bar to a locked position wherein the key rotationally fixes the nut to the first end of the torsion bar.

2. The retractor of claim 1, wherein the slot engages the key when the nut is in the locked position.

3. The retractor of claim 2, wherein the nut has an exterior shape, and the torsion tube includes a recess disposed at the first end, the recess defined to receive the exterior shape of the nut.

4. The retractor of claim 3, wherein the exterior shape of the nut is polygonal.

5. The retractor of claim 2, wherein the nut has an interior shape, and the torsion bar includes a circumferential protrusion, the protrusion defined to receive the interior shape of the nut.

6. The retractor of claim 5, wherein the interior shape of the nut is polygonal.

7. The retractor of claim 2, wherein the key pushes against a surface of the nut when the nut is in the unlocked position.

8. The retractor of claim 7, further comprising a coating on the surface of the nut that has a low coefficient of friction relative to other surfaces of the nut.

9. The retractor of claim 1, further comprising a ratchet attached to the first end of the torsion bar.

10. The retractor of claim 9, further comprising a spring disposed between the ratchet and the nut, wherein the spring is in compression when the nut is in the unlocked position.

11. The retractor of claim 10, wherein the key pushes against the 1 nut when the nut is in the unlocked position.

12. The retractor of claim 11, wherein the spring is attached to the ratchet.

13. The retractor of claim 9, further comprising a housing, wherein the spool is rotatably coupled to the housing.

14. The retractor of claim 13, further comprising a pawl hingedly coupled to the housing.

15. The retractor of claim 14, wherein the pawl is movable between an unlocked position spaced from the ratchet and a locked position engaging the ratchet.

16. The retractor of claim 1, further comprising a housing, wherein the spool is rotatably coupled to the housing.

17. The retractor of claim 16, further comprising a spool spring coupled to the spool and the housing.

18. The retractor of claim 17, further comprising webbing having an end, the end of the webbing attached to the spool.

* * * * *